(12) United States Patent
Tatsuzawa et al.

(10) Patent No.: US 12,322,548 B2
(45) Date of Patent: Jun. 3, 2025

(54) EXTERIOR MATERIAL FOR ELECTRICAL STORAGE DEVICE, METHOD FOR MANUFACTURING SAME, AND ELECTRICAL STORAGE DEVICE

(71) Applicant: DAI NIPPON PRINTING CO., LTD., Tokyo (JP)

(72) Inventors: Masahiro Tatsuzawa, Tokyo (JP); Jun Kageyama, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 817 days.

(21) Appl. No.: 17/600,498

(22) PCT Filed: Apr. 3, 2020

(86) PCT No.: PCT/JP2020/015407
§ 371 (c)(1),
(2) Date: Dec. 20, 2021

(87) PCT Pub. No.: WO2020/204186
PCT Pub. Date: Oct. 8, 2020

(65) Prior Publication Data
US 2022/0173461 A1    Jun. 2, 2022

(30) Foreign Application Priority Data

Apr. 4, 2019  (JP) ................... 2019-072336
Aug. 1, 2019  (JP) ................... 2019-142005

(51) Int. Cl.
*H01M 50/126* (2021.01)
*H01G 11/78* (2013.01)
(Continued)

(52) U.S. Cl.
CPC ............ *H01G 11/84* (2013.01); *H01G 11/78* (2013.01); *H01M 50/126* (2021.01); *H01M 50/131* (2021.01)

(58) Field of Classification Search
None
See application file for complete search history.

(56) References Cited

U.S. PATENT DOCUMENTS

2008/0286635 A1    11/2008 Seino et al.
2009/0191448 A1    7/2009 Yamamoto et al.
(Continued)

FOREIGN PATENT DOCUMENTS

CN    109417133 A    3/2019
JP    2008-287971 A    11/2008
(Continued)

OTHER PUBLICATIONS

Jan. 31, 2024 Office Action Issued in Chinese Patent Application No. 202080026037.5.
(Continued)

*Primary Examiner* — Lisa S Park
(74) *Attorney, Agent, or Firm* — Oliff PLC

(57) ABSTRACT

An exterior material for an electrical storage device includes a matte-finished design which is achieved by a filler-containing surface coating layer and is resistant to damage due to heat sealing, the exterior material having superior moldability. The exterior material for an electrical storage device is composed of a layered body including at least, in this order from the outer side, a surface coating layer, a base material layer, a barrier layer, and a thermally adhesive resin layer. The surface coating layer includes a resin and a filler. The logarithmic decrement ΔE at 200° C. according to a
(Continued)

rigid body pendulum measurement of an outer surface of the surface coating layer of the layered body is not more than 0.43.

20 Claims, 2 Drawing Sheets

(51) Int. Cl.
*H01G 11/84* (2013.01)
*H01M 50/131* (2021.01)

(56) References Cited

U.S. PATENT DOCUMENTS

| | | |
|---|---|---|
| 2012/0135301 A1 | 5/2012 | Akita et al. |
| 2014/0205894 A1 | 7/2014 | Akita et al. |
| 2015/0255761 A1 | 9/2015 | Hashimoto et al. |
| 2016/0190525 A1 | 6/2016 | Akita et al. |
| 2018/0019502 A1 | 1/2018 | Iizuka et al. |
| 2018/0040861 A1 | 2/2018 | Akita et al. |
| 2020/0080171 A1* | 3/2020 | Shingu ............... B32B 27/304 |

FOREIGN PATENT DOCUMENTS

| | | | |
|---|---|---|---|
| JP | 2011-054563 A | | 3/2011 |
| JP | 5031606 B2 | | 9/2012 |
| JP | 2017066434 | * | 4/2017 |
| JP | 2017633434 | * | 4/2017 |
| JP | 2017-188227 | * | 10/2017 |
| JP | 2017-188227 A | | 10/2017 |
| JP | 2018-008497 A | | 1/2018 |
| WO | 2014/050542 A1 | | 4/2014 |
| WO | WO2017065296 | * | 4/2017 |
| WO | WO2018008767 | * | 1/2018 |
| WO | 2018/097329 A1 | | 5/2018 |
| WO | 2019/027021 A1 | | 2/2019 |

OTHER PUBLICATIONS

Jun. 30, 2020 Search Report issued in International Patent Application No. PCT/JP2020/015407.

Oct. 6, 2020 Office Action issued in Japanese Patent Application No. 2020-545608.

* cited by examiner

EXTERIOR MATERIAL FOR ELECTRICAL STORAGE DEVICE, METHOD FOR MANUFACTURING SAME, AND ELECTRICAL STORAGE DEVICE

TECHNICAL FIELD

The present disclosure relates to an exterior material for electrical storage devices, a method for manufacturing the exterior material for electrical storage devices, and an electrical storage device.

BACKGROUND ART

Various types of electrical storage devices have been developed heretofore, and in every electrical storage device, an exterior material is an essential member for sealing electrical storage device elements such as an electrode and an electrolyte. Metallic exterior materials have been often used heretofore as exterior materials for electrical storage devices.

On the other hand, in recent years, electrical storage devices have been required to be diversified in shape and to be thinned and lightened with improvement of performance of electric cars, hybrid electric cars, personal computers, cameras, mobile phones and so on. However, metallic exterior material for electrical storage devices that have often been heretofore used have the disadvantage that it is difficult to keep up with diversification in shape, and there is a limit on weight reduction.

Thus, in recent years, a film-shaped laminate with a base material layer, a barrier layer and a heat-sealable resin layer laminated in this order has been proposed as an exterior material for electrical storage devices which is easily processed into diversified shapes and is capable of achieving thickness reduction and weight reduction (see, for example, Patent Document 1).

In such an exterior material for electrical storage devices, generally, a concave portion is formed by cold molding, electrical storage device elements such as an electrode and an electrolytic solution are disposed in a space formed by the concave portion, and heat-sealable resin layers are heat-sealed (thermally sealed) to obtain an electrical storage device with electrical storage device elements stored in the exterior material for electrical storage devices.

PRIOR ART DOCUMENT

Patent Document

Patent Document 1: Japanese Patent Laid-open Publication No. 2008-287971

SUMMARY OF THE INVENTION

Problems to be Solved by the Invention

In an exterior material for electrical storage devices which includes a film-shaped laminate, a surface coating layer containing a filler may be provided on the outer side of a base material layer for making the outer surface have a matte-toned design (matte).

However, there is a problem that when a heat-sealable resin layer is thermally sealed by applying heat and pressure onto a surface coating layer using a heat sealing member (e.g. a metallic heat seal bar) at the time of sealing an electrical storage device element using an exterior material for electrical storage devices, the irregularity shape of the surface of the surface coating layer formed by a filler is crushed, so that a matte-toned design of a thermally sealed portion is impaired.

Under such circumstances, a main object of the present disclosure is to provide an exterior material for electrical storage devices in which a matte-toned design from a surface coating layer containing a filler is inhibited from being impaired by thermal sealing.

Means for Solving the Problem

The inventors of the present disclosure have extensively conducted studies for solving the above-described problems. As a result, the inventors have devised an exterior material for electrical storage devices including a laminate including at least a surface coating layer, a base material layer, a barrier layer and heat-sealable resin layer in this order from the outside, in which the surface coating layer contains a resin and a filler, and the logarithmic decrement $\Delta E$ of the outer surface of the surface coating layer of the laminate is 0.43 or less at 200° C. in measurement with a rigid body pendulum. In the exterior material for electrical storage devices, a matte-toned design from the surface coating layer containing the filler is inhibited from being impaired by thermal heating.

The present disclosure has been completed by further conducting studies on the basis of the above-described finding. That is, the present disclosure provides an invention of an aspect as described below:

An exterior material for electrical storage devices including a laminate including at least a surface coating layer, a base material layer, a barrier layer and heat-sealable resin layer in this order from the outside, in which the surface coating layer contains a resin and a filler, and the logarithmic decrement $\Delta E$ of the outer surface of the surface coating layer of the laminate is 0.43 or less at 200° C. in measurement with a rigid body pendulum.

Advantages of the Invention

According to the present disclosure, it is possible to provide an exterior material for electrical storage devices in which a matte-toned design from a surface coating layer containing a filler is inhibited from being impaired by thermal sealing. According to the present disclosure, it is also possible to provide a method for manufacturing the exterior material for electrical storage devices, and an electrical storage device obtained using the exterior material for electrical storage devices.

EMBODIMENTS OF THE INVENTION

An exterior material for electrical storage devices of the disclosure includes a laminate including at least a surface coating layer, a base material layer, a barrier layer and heat-sealable resin layer in this order from the outside, in which the surface coating layer contains a resin and a filler, and the logarithmic decrement ΔE of the outer surface of the surface coating layer of the laminate is 0.43 or less at 200° C. in measurement with a rigid body pendulum. The exterior material for electrical storage devices of the disclosure has such a configuration, so that the matte-toned design from a surface coating layer containing a filler is inhibited from being impaired by thermal sealing.

Hereinafter, the exterior material for electrical storage devices according to the present disclosure will be described in detail. In this specification, a numerical range indicated by the term "A to B" means "A or more" and "B or less". For example, the expression of "2 to 15 mm" means 2 mm or more and 15 mm or less.

Figure 1:
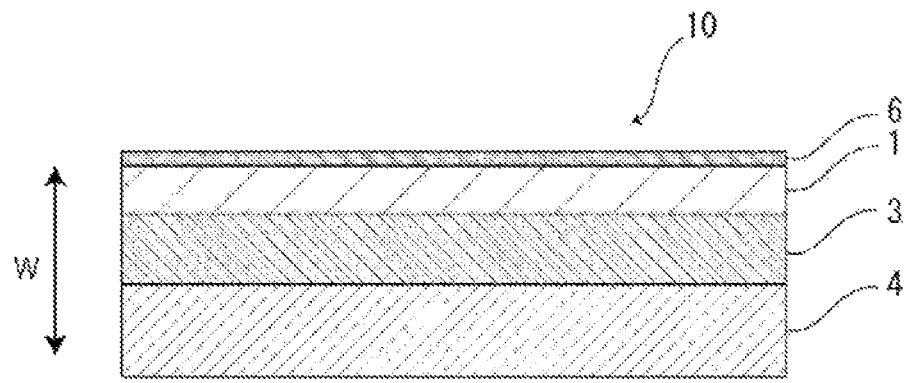
FIG. 1 is a schematic diagram showing an example of a cross-sectional structure of an exterior material for electrical storage devices according to the present disclosure.

1. Laminated Structure and Physical Property of Exterior Material for Electrical Storage Devices As shown in, for example, FIGS. 1 to 3, an exterior material 10 for electrical storage devices according to the present disclosure includes a laminate including at least a surface coating layer 6, a base material layer 1, a barrier layer 3 and a heat-sealable resin layer 4 in this order from the outside. In the exterior material 10 for electrical storage devices, the surface coating layer 6 is an outermost layer, and the heat-sealable resin layer 4 is an innermost layer. In construction of the electrical storage device using the exterior material 10 for electrical storage devices and electrical storage device elements, the electrical storage device elements are put in a space formed by heat-sealing the peripheral portions of heat-sealable resin layers 4 of the exterior material 10 for electrical storage devices which face each other. In the laminate forming the exterior material 10 for electrical storage devices according to the present disclosure, the heat-sealable resin layer 4 is on the inner side with respect to the barrier layer 3, and the surface coating layer 6 is on the outer side with respect to the barrier layer 3.

Figure 2:
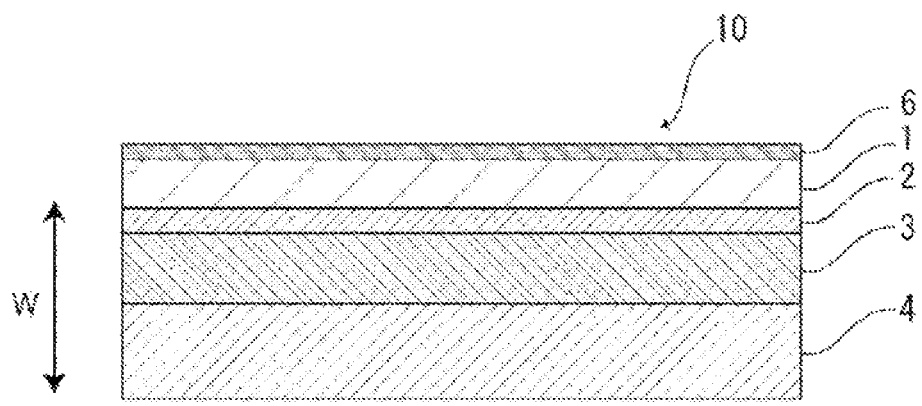
FIG. 2 is a schematic diagram showing an example of a cross-sectional structure of an exterior material for electrical storage devices according to the present disclosure.
Figure 3:
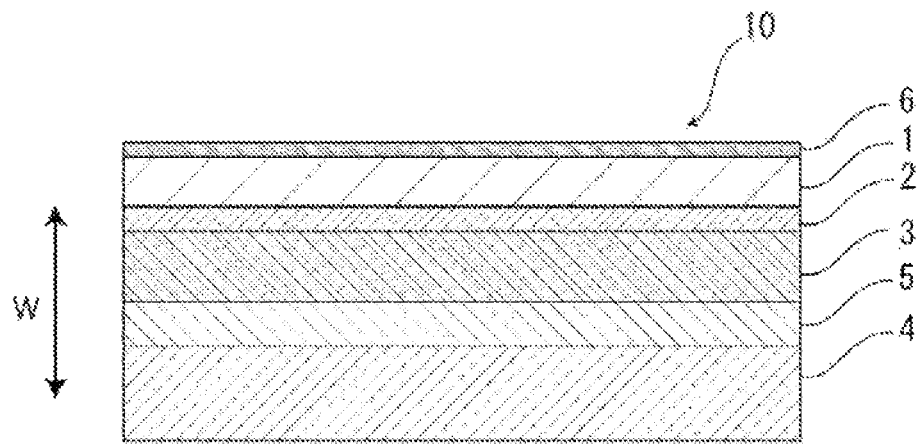
FIG. 3 is a schematic diagram showing an example of a cross-sectional structure of an exterior material for electrical storage devices according to the present disclosure.

As shown in, for example, FIGS. 2 and 3, the exterior material 10 for electrical storage devices may have an adhesive agent layer 2 between the base material layer 1 and the barrier layer 3 if necessary for the purpose of, for example, improving bondability between these layers. A colored layer may be provided between the base material layer 1 and the barrier layer 3 (not shown). As shown in, for example, FIG. 3, an adhesive layer 5 may be present between the barrier layer 3 and the heat-sealable resin layer 4 if necessary for the purpose of, for example, improving bondability between these layers.

The thickness of the laminate forming the exterior material 10 for electrical storage devices is not particularly limited, and is preferably about 180 μm or less, about 160 μm or less, about 155 μm or less, about 140 μm or less, about 130 μm or less, or about 120 μm or less from the viewpoint of cost reduction, improvement of the energy density and the like, and preferably about 35 μm or more, about 45 μm or more, about 60 μm or more, or about 80 μm or more from the viewpoint of maintaining the function of the exterior material for electrical storage devices, which is protection of electrical storage device elements. For example, the thickness is preferably in the range of about 35 to 180 μm, about 35 to 160 μm, about 35 to 155 μm, about 35 to 140 μm, about 35 to 130 μm, about 35 to 120 μm, about 45 to 180 μm, about 45 to 160 μm, about 45 to 155 μm, about 45 to 140 μm, about 45 to 130 μm or more, about 45 to 120 μm, about 60 to 180 μm, about 60 to 160 μm, about 60 to 155 μm, about 60 to 140 μm, about 60 to 130 μm, about 60 to 120 μm, about 80 to 180 μm, about 80 to 160 μm, about 80 to 155 μm, about 80 to 140 μm, about 80 to 130 μm or about 80 to 120 μm. Above all, the thickness is particularly preferably about 80 to 130 μm.

In the exterior material 10 for electrical storage devices according to the present disclosure, the logarithmic decrement ΔE of the outer surface of the surface coating layer 6 of the laminate forming the exterior material 10 for electrical storage devices is 0.43 or less at 200° C. in measurement with a rigid body pendulum. The exterior material 10 for electrical storage devices has the above-described logarithmic decrement ΔE at a very high temperature of 200° C., so that the matte-toned design from the surface coating layer 6 containing a filler is inhibited from being impaired by thermal sealing.

The logarithmic decrement ΔE at 200° C. may be 0.43 or less, and is preferably about 0.40 or less, and preferably about 0.30 or more, more preferably about 0.35 or more, and is preferably in the range of about 0.30 to 0.43, about 0.30 to 0.40, about 0.35 to 0.43 or about 0.35 to 0.40, from the viewpoint of further effectively inhibiting the matte-toned design from being impaired by thermal sealing (hereinafter, sometimes referred to as the viewpoint of matte-toned design). Above all, the logarithmic decrement ΔE is particularly preferably about 0.35 to 0.40. The logarithmic decrement ΔE at 200° C. is measured as follows.

[Measurement of Logarithmic Decrement ΔE of Outer Surface of Surface Coating Layer]

The exterior material for electrical storage devices is cut into a rectangle having a width of 15 mm (TD: Transverse Direction) and a length of 50 mm (MD: Machine Direction) to obtain a test sample. A rigid body pendulum physical property tester (model: RPT-3000W manufactured by A&D Company, Limited) is used, FRB-100 is used for a frame of the pendulum, cylindrical cylinder edge RBP-080 is used for the edge portion, and the initial amplitude is set to about 0.3 degrees. The pendulum is placed in such a manner that the central axis direction of the cylindrical cylinder and the machine direction of the test sample are orthogonal to each other. In addition, for preventing floating and warpage of the test sample during measurement, a kapton tape is attached to the test sample at a position having no effect on measurement results, and fixed. The cylindrical cylinder edge is brought into contact with the outer surface of the surface coating layer. Next, the logarithmic decrement ΔE of the surface coating layer is measured in a temperature range of 30° C. to 200° C. at a temperature rise rate of 3° C./min using a cold block CHB-100. A logarithmic decrement ΔE is adopted at which the temperature of the surface coating layer of the test sample is 200° C. An average of two measurements (N=2) made by using an unused cut sample rather than using a test sample once measured is used.

The logarithmic decrement ΔE at 200° C. can be adjusted by the composition (types and contents of resin, filler and the like) of the resin composition forming the surface coating layer 6, curing conditions, the molecular weight, the number of functional groups, the crosslinking density, the bulkiness of substituents, and the like.

From the viewpoint of improving the matte-toned design and moldability at normal temperature, the hardness of the resin of the surface coating layer 6 measured by a nanoindentation method on a thickness-direction cross section of the surface coating layer 6 in an environment at 23° C. in the exterior material 10 for electrical storage devices of the disclosure is preferably about 420.4 MPa or less, more preferably about 350.4 MPa or less, still more preferably about 310.4 MPa or less, and preferably about 25.5 MPa or more, preferably about 50.0 MPa or more, more preferably about 100.0 MPa or more, still more preferably about 150.0 MPa or more, and is preferably in the range of 22.5 to 420.4 MPa, about 22.5 to 350.4 MPa, about 22.5 to 310.4 MPa, about 50.0 to 420.4 MPa, about 50.0 to 350.4 MPa, about 50.0 to 310.4 MPa, about 100.0 to 420.4 MPa, about 100.0 to 350.4 MPa, about 100.0 to 310.4 MPa, about 150.0 to 420.4 MPa, about 150.0 to 350.4 MPa, or about 150.0 to 310.4 MPa. Above all, the hardness is particularly preferably about 150.0 to 310.4 MPa. In the present invention, more specifically, being excellent in moldability means that by molding the exterior material 10 for electrical storage devices, impairment of the matte-toned design of the surface coating layer and the occurrence of cracking and peeling in the surface coating layer due to molding at normal temperature are suppressed. The hardness measured by a nanoindentation method in an environment at 23° C. is measured as follows.

[Hardness Measured by Nanoindentation Method in 23° C. Environment]

The hardness is measured using a nanoindenter (e.g. "TI 950 TriboIndenter" manufactured by HYSITRON Inc.) as an apparatus. As the indenter of the nanoindenter, a Berkovich indenter (e.g. TI-0039) is used. First, in an environment at 23° C. and a relative humidity of 50%, the indenter is applied to a surface of the surface coating layer of the exterior material for electrical storage devices (a surface on which the surface coating layer is exposed and in a direction perpendicular to a laminating direction of each layer (see a thickness direction W in FIGS. 1 to 3)), the indenter is pushed into the surface coating layer from the surface to a load of 50 N over 10 seconds, and held in this state for 5 seconds, and the load is removed over 10 seconds. An average value of measurements (N=5) performed while changing measurement spots is defined as a hardness. The surface into which the indenter is pushed is a resin portion in which a cross-section of the surface coating layer (a cross-section of the surface coating layer in the thickness direction) is exposed, the cross-section being obtained by cutting the resin portion in the thickness direction so as to pass through a central portion (which may be near the center) of the exterior material for electrical storage devices. The cutting is performed using a commercially available rotary microtome.

The hardness measured by a nanoindentation method in an environment at 23° C. can be adjusted by the composition (types and contents of resin, filler and the like) of the resin composition forming the surface coating layer 6, curing conditions, the molecular weight, the number of functional groups, the crosslinking density, the bulkiness of substituents, and the like.

From the viewpoint of the matte-toned design, the arithmetic average roughness $Ra_1$ of the outer surface of the surface coating layer 6 in the exterior material 10 for electrical storage devices according to the present disclosure is preferably about 0.30 μm or more, more preferably about 0.40 μm or more, still more preferably 0.50 or more, and preferably about 0.90 μm or less, more preferably about 0.80 μm or less, still more preferably about 0.70 μm or less, and is preferably in the range of about 0.30 to 0.90 μm, about 0.30 to 0.80 μm, about 0.30 to 0.70 μm, about 0.40 to 0.90 μm, about 0.40 to 0.80 μm, about 0.40 to 0.70 μm, about 0.50 to 0.90 μm, about 0.50 to 0.80 μm, or about 0.50 to 0.70 μm. Above all, the arithmetic average roughness is particularly preferably about 0.50 to 0.70 μm. In addition, the ratio of the arithmetic average roughness $Ra_2$ of the outer surface of the surface coating layer 6 after heating and pressurization of the outer surface of the surface coating layer 6 under the conditions of a temperature of 190° C., a surface pressure of 0.5 MPa and 6 seconds using a stainless steel plate to the arithmetic average roughness $Ra_1$ of the outer surface of the surface coating layer 6 before heating and pressurization of the outer surface of the surface coating layer ($Ra_2/Ra_1$) is preferably 0.7 or more. The upper limit of the ratio $Ra_2/Ra_1$ is not particularly limited, and is, for example, 1.0 or 0.95.

2. Layers Forming Exterior Material for Electrical Storage Devices

[Surface Coating Layer 6]

The exterior material 10 for electrical storage devices according to the present disclosure has the surface coating layer 6 outside the base material layer 1 for the purpose of, for example, imparting a matte-toned design to the outer surface of the exterior material 10 for electrical storage devices. The surface coating layer 6 is a layer located on the outermost layer of the exterior material 10 for electrical storage devices when the electrical storage device is constructed using the exterior material 10 for electrical storage devices.

The surface coating layer 6 contains a resin and a filler. The filler is preferably particles. Examples of the filler include inorganic fillers (preferably inorganic particles) and organic fillers (preferably organic particles). The surface coating layer 6 may contain one type or two or more types of fillers. It is also preferable to use an inorganic filler and an organic filler in combination. The shape of the filler is not particularly limited, and examples thereof include a spherical shape, a fibrous shape, a plate shape, an amorphous shape and a scaly shape.

The average particle diameter of the filler is not particularly limited, and is, for example, about 0.01 to 5 μm from the viewpoint of ensuring that the exterior material 10 for electrical storage devices has a matte-toned design. The average particle size of the filler is a median diameter measured by a laser diffraction/scattering particle size distribution measuring apparatus. The average particle diameter of the filler is preferably equal to or less than the thickness of the surface coating layer 6.

The inorganic filler is not particularly limited as long as the surface coating layer 6 have a matte tone, and examples thereof include particles of silica, talc, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, gold, aluminum, copper and nickel. Of these, silica particles are particularly preferable.

The organic filler is not particularly limited as long as the surface coating layer 6 can have a matte tone, and examples thereof include particles of nylon, polyacrylate, polystyrene, polyethylene, benzoguanamine and crosslinked products thereof.

In the measurement of the [hardness measured by a nanoindentation method in an environment at 23° C.], the hardness of the organic filler contained in the surface coating layer 6 can be measured where the surface into which the indenter is pushed is defined as a portion in which a cross section of the surface coating layer is exposed and an organic filler is present, the cross-section being obtained by cutting the surface coating layer in the thickness direction so as to pass through a central portion (which may be near the center) of the exterior material for electrical storage devices. From the viewpoint of the matte-toned design and moldability, the hardness of the organic filler measured in the above-mentioned manner is preferably about 350.0 MPa or more, more preferably about 400.0 MPa or more, and preferably about 1500.4 MPa or less, more preferably about 1000.4 MPa or less, still more preferably about 600.4 MPa or less, and is preferably in the range of about 300.0 to 1500.4 MPa, about 300.0 to 1000.4 MPa, about 300.0 to 600.4 MPa, about 400.0 to 1500.4 MPa, about 400.0 to 1000.4 MPa, or about 400.0 to 600.4 MPa, particularly preferably about 400.0 to 600.4 MPa.

The content of the filler contained in the surface coating layer 6 is not particularly limited as long as the logarithmic decrement ΔE of the outer surface of the surface coating layer 6 is 0.43 or less at 200° C. in measurement with a rigid body pendulum, and the content is preferably about 3 parts by mass or more, more preferably about 10 parts by mass or more, and preferably about 30 parts by mass or less, more preferably about 20 parts by mass or less, and is preferably in the range of about 3 to 30 parts by mass, about 3 to 20 parts by mass, about 10 to 30 parts by mass, or about 10 to 20 parts by mass, based on 100 parts by mass of the resin in the resin composition forming the surface coating layer 6.

The resin contained in the resin composition forming the surface coating layer 6 is not particularly limited as long as the logarithmic decrement ΔE is 0.43 or less at 200° C., and the resin is preferably a curable resin. That is, it is preferable that the surface coating layer 6 includes a cured product of a resin composition containing a curable resin and a filler.

The resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a main agent containing a polyol compound and a curing agent containing an isocyanate compound. The polyurethane is preferably two-liquid curable polyurethane having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Examples of the curing agent include aliphatic, alicyclic, aromatic and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H 12 MDI), tolylene diisocyanate (TDI), diphenylmethane diisocyanate (MDI) and naphthalene diisocyanate (NDI). Examples of the isocyanate-based compound also include polyfunctional isocyanate-modified products of one or more of these diisocyanates can be mentioned. It is also possible to use a multimer (e.g. a trimer) as the polyisocyanate compound. Examples of the multimer include adducts, biurets, and nurates. The aliphatic isocyanate-based compound is an isocyanate having an aliphatic group and having no aromatic ring, the alicyclic isocyanate-based compound is an isocyanate having an alicyclic hydrocarbon group, and the aromatic isocyanate-based compound is an isocyanate having an aromatic ring.

When the resin in the resin composition forming the surface coating layer 6 is a polyurethane containing a main agent containing a polyol compound and a curing agent containing an isocyanate compound, the logarithmic decrement ΔE at 200° C. and the hardness measured by a nanoindentation method in an environment at 23° C. can also be adjusted by, for example, adjusting the ratio of the main agent to the curing agent.

If necessary, the surface coating layer 6 may further contain additives such as a slipping agent and a colorant as described later, an anti-blocking agent, a flame retardant, an antioxidant, a tackifier and an anti-static agent on at least one of the surface and the inside of the surface coating layer 6 according to the functionality and the like to be imparted to the surface coating layer 6 and the surface thereof.

When the surface coating layer 6 contains a colorant, a known colorant such as pigments and dyes can be used as the colorant. The colorants may be used alone, or may be used in combination of two or more thereof. Specific examples of the colorant contained in the surface coating layer 6 include the same colorants as those exemplified in the section [Adhesive agent Layer 2]. The preferred content of the colorant contained in the surface coating layer 6 is also the same as the content described in the section [Adhesive Agent Layer 2].

The method for forming the surface coating layer 6 is not particularly limited, and examples thereof include a method in which a resin composition for forming the surface coating layer 6 is applied. When the additive is added to the surface coating layer 6, a resin mixed with the additive may be applied.

From the viewpoint of the matte-toned design, the thickness of the surface coating layer 6 is preferably 0.5 μm or more, more preferably 1 μm or more, and preferably 10 μm or less, more preferably 5 μm or less, and is preferably in the range of about 0.5 to 10 μm, about 0.5 to 5 μm, about 1 to 10 μm, or about 1 to 5 μm.

In the present disclosure, it is preferable that a slipping agent is present on the surface of the surface coating layer 6 from the viewpoint of enhancing the moldability of the exterior material for electrical storage devices. The slipping agent is not particularly limited, and is preferably an amide-based slipping agent. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides, and aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide, and N-stearyl erucic acid amide. Specific examples of the methylolamide include methylolstearic acid amide. Specific examples of the saturated fatty acid bisamide include methylenebisstearic acid amide, ethylenebiscapric acid amide, ethylenebislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide and N,N'-dioleylsebacic acid amide. Specific examples of the fatty acid ester amide include stearoamideethyl stearate. Specific examples of the aromatic bisamide include m-xylylenebisstearic acid amide, m-xylylenebishydroxystearic acid amide and N,N'-distearylisophthalic acid amide. The slipping agents may be used alone, or may be used in combination of two or more thereof.

When the slipping agent is present on the surface of the surface coating layer 6, the amount of the slipping agent present is not particularly limited, and is preferably about 3 mg/m$^2$ or more, more preferably about 4 to 15 mg/m$^2$, still more preferably about 5 to 14 mg/m$^2$.

The slipping agent present on the surface of the surface coating layer 6 may be one obtained by exuding the slipping agent contained in the surface coating layer 6, or one obtained by applying the slipping agent to the surface of the surface coating layer 6.

[Base Material Layer 1]

In the present disclosure, the base material layer 1 is a layer provided for the purpose of, for example, exhibiting a function as a base material of the exterior material for electrical storage devices. The base material layer 1 is located between the surface coating layer 6 and the barrier layer 3 of the exterior material 10 for electrical storage devices. When the adhesive agent layer 2 is present, the adhesive agent layer 2 is located between the surface coating layer 6 and the adhesive agent layer 2.

The material that forms the base material layer 1 is not particularly limited as long as it has a function as a base material, i.e. at least insulation quality. The base material layer 1 can be formed using, for example, a resin, and the resin may contain additives described later.

When the base material layer 1 is formed of a resin, the base material layer 1 may be, for example, a resin film formed of a resin, or may be formed by applying a resin. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate, and copolyesters. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polyamide MXD6 (polymethaxylylene adipamide); cycloaliphatic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film. Since the polyester resin is hardly discolored even in the case where for example, an electrolytic solution is deposited on the surface, it is preferable that the polyester resin film is located at the outermost layer of the base material layer 1 when the base material layer 1 is a resin film laminate with two or more layers.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive. Here, the thickness of the adhesive is, for example, about 2 to 5 m. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 µm.

Additives such as a slipping agent, a flame retardant, an antiblocking agent, an antioxidant, a light stabilizer, a tackifier and an antistatic agent may be present on at least one of the surface of the base material layer 1 and/or inside the base material layer 1. The additives may be used alone, or may be used in combination of two or more thereof.

The thickness of the base material layer 1 is not particularly limited as long as a function as a base material is performed, and the thickness of the base material layer 1 is, for example, about 3 to 50 µm, about 3 to 35 m, or about 3 to 25 µm. When the base material layer 1 is a resin film laminate with two or more layers, the thickness of the resin film forming each layer is preferably about 2 to 25 µm.

[Adhesive Agent Layer 2]

In the exterior material for electrical storage devices of the present disclosure, the adhesive agent layer 2 is a layer provided between the base material layer 1 and the barrier layer 3 if necessary for the purpose of enhancing bondability between these layers.

The adhesive agent layer 2 is formed from an adhesive capable of bonding the base material layer 1 and the barrier layer 3. The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a main agent containing a polyol compound and a curing agent containing an isocyanate compound. The polyurethane adhesive is preferably a two-liquid curable polyurethane adhesive having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Examples of the curing agent include aliphatic, alicyclic, aromatic and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H 12 MDI), tolylene diisocyanate (TDI), diphenylmethane diisocyanate (MDI) and naphthalene diisocyanate (NDI). Examples of the isocyanate-based compound also include polyfunctional isocyanate-modified products of one or more of these diisocyanates can be mentioned. It is also possible to use a multimer (e.g. a trimer) as the polyisocyanate compound. Examples of the multimer include adducts, biurets, and nurates. Since the adhesive agent layer 2 is formed of a polyurethane adhesive, excellent electrolytic solution resistance is imparted to the exterior material for electrical storage devices, so that peeling of the base material layer 1 is suppressed even if the electrolytic solution is deposited on the side surface.

Other components may be added to the adhesive agent layer 2 as long as bondability is not inhibited, and the adhesive agent layer 2 may contain a colorant, a thermoplastic elastomer, a tackifier, a filler, and the like. When the adhesive agent layer 2 contains a colorant, the exterior material for electrical storage devices can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinoneperylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the exterior material for electrical storage devices.

The average particle diameter of the pigment is not particularly limited, and is, for example, about 0.05 to 5 µm, preferably about 0.08 to 2 µm. The average particle size of the pigment is a median diameter measured by a laser diffraction/scattering particle size distribution measuring apparatus.

The content of the pigment in the adhesive agent layer 2 is not particularly limited as long as the exterior material for electrical storage devices is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 μm or more, or about 2 μm or more for the lower limit, and about 10 μm or less, or about 5 μm or less for the upper limit, and is preferably in the range of about 1 to 10 μm, about 1 to 5 μm, about 2 to 10 μm, or about 2 to 5 μm.

[Colored Layer]

The colored layer is a layer provided between the base material layer 1 and the barrier layer 3 if necessary (not shown). When the adhesive agent layer 2 is present, the colored layer may be provided between the base material layer 1 and the adhesive agent layer 2 or between the adhesive agent layer 2 and the barrier layer 3. The colored layer may be provided outside the base material layer 1. By providing the colored layer, the exterior material for electrical storage devices can be colored.

The colored layer can be formed by, for example, applying an ink containing a colorant to the surface of the base material layer 1, or the surface of the barrier layer 3. As the colorant, known colorants such as pigments and dyes can be used. The colorants may be used alone, or may be used in combination of two or more thereof.

Specific examples of the colorant contained in the colored layer include the same colorants as those exemplified in the section [Adhesive Agent Layer 2].

[Barrier Layer 3]

In the exterior material for electrical storage devices, the barrier layer 3 is a layer which suppresses at least ingress of moisture.

Examples of the barrier layer 3 include metal foils, deposited films and resin layers having a barrier property. Examples of the deposited film include metal deposited films, inorganic oxide deposited films and carbon-containing inorganic oxide deposited films, and examples of the resin layer include those of polyvinylidene chloride, fluorine-containing resins such as polymers containing chlorotrifluoroethylene (CTFE) as a main component, polymers containing tetrafluoroethylene (TFE) as a main component, polymers having a fluoroalkyl group, and polymers containing a fluoroalkyl unit as a main component, and ethylene vinyl alcohol copolymers. Examples of the barrier layer 3 include resin films provided with at least one of these deposited films and resin layers. A plurality of barrier layers 3 may be provided. Preferably, the barrier layer 3 contains a layer formed of a metal material. Specific examples of the metal material forming the barrier layer 3 include aluminum alloys, stainless steel, titanium steel and steel sheets. When the metal material is used as a metal foil, it is preferable that the metal material includes at least one of an aluminum alloy foil and a stainless steel foil.

The aluminum alloy is more preferably a soft aluminum alloy foil formed of, for example, an annealed aluminum alloy from the viewpoint of suppressing occurrence of pinholes and cracking during molding of the exterior material for electrical storage devices, and is preferably an aluminum alloy foil containing iron from the viewpoint of more effectively suppressing occurrence of pinholes and cracking during the molding. In the aluminum alloy foil containing iron (100 mass %), the content of iron is preferably 0.1 to 9.0 mass %, more preferably 0.5 to 2.0 mass %. When the content of iron is 0.1 mass % or more, it is possible to obtain an exterior material for electrical storage devices in which occurrence of pinholes and cracking during molding is effectively suppressed. When the content of iron is 9.0 mass % or less, it is possible to obtain an exterior material for electrical storage devices more excellent in flexibility. Examples of the soft aluminum alloy foil include aluminum alloy foils having a composition specified in JIS H4160: 1994 A8021H-O, JIS H4160: 1994 A8079H-O, JIS H4000: 2014 A8021P-O, or JIS H4000: 2014 A8079P-O. If necessary, silicon, magnesium, copper, manganese or the like may be added. Softening can be performed by annealing or the like.

Examples of the stainless steel foil include austenitic stainless steel foils, ferritic stainless steel foils, austenitic/ferritic stainless steel foils, martensitic stainless steel foils and precipitation-hardened stainless steel foils. From the viewpoint of further suppressing occurrence of pinholes and cracking during molding of the exterior material for electrical storage devices, it is preferable that the stainless steel foil is formed of austenitic stainless steel.

Specific examples of the austenite-based stainless steel foil include SUS 304 stainless steel, SUS 301 stainless steel and SUS 316L stainless steel, and of these, SUS 304 stainless steel is especially preferable.

When the barrier layer 3 is a metal foil, the barrier layer 3 may perform a function as a barrier layer suppressing at least ingress of moisture, and has a thickness of, for example, about 9 to 200 μm. For example, the thickness of the barrier layer 3 is preferably about 85 μm or less, more preferably about 50 μm or less, still more preferably about 40 μm or less, especially preferably about 35 μm or less for the upper limit, and preferably about 10 μm or more, more preferably about 20 μm or more, still more preferably about 25 μm or more for the lower limit, and is preferably in the range of about 10 to 85 μm, about 10 to 50 μm, about 10 to 40 μm, about 10 to 35 μm, about 20 to 85 μm, about 20 to 50 μm, about 20 to 40 μm, about 20 to 35 μm, about 25 to 85 μm, about 25 to 50 μm, about 25 to 40 μm, or about 25 to 35 μm. Above all, the thickness is particularly preferably about 25 to 40 μm. When the barrier layer 3 is formed of an aluminum alloy foil, the thickness thereof is especially preferably in above-described range. Particularly, when the barrier layer 3 is formed of a stainless steel foil, the thickness of the stainless steel foil is preferably about 60 μm or less, more preferably about 50 μm or less, still more preferably about 40 μm or less, even more preferably about 30 μm or less, especially preferably about 25 μm or less for the upper limit, and preferably about 10 μm or more, more preferably about 15 μm or more for the lower limit, and is preferably in the range of about 10 to 60 μm, about 10 to 50 μm, about 10 to 40 μm, about 10 to 30 μm, about 10 to 25 μm, about 15 to 60 μm, about 15 to 50 μm, about 15 to 40 μm, about 15 to 30 μm, or about 15 to 25 μm.

When the barrier layer 3 is a metal foil, it is preferable that a corrosion-resistant film is provided at least on a surface on a side opposite to the base material layer for preventing dissolution and corrosion. The barrier layer 3 may include a corrosion-resistant film on each of both surfaces. Here, the corrosion-resistant film refers to a thin film obtained by subjecting the surface of the barrier layer to, for example, hydrothermal denaturation treatment such as boehmite treatment, chemical conversion treatment, anodization treatment, plating treatment with nickel, chromium or the like, or corrosion prevention treatment by applying a coating agent to impart corrosion resistance to the barrier layer. One of treatments for forming the corrosion-resistant film may be performed, or two or more thereof may be performed in combination. In addition, not only one layer but also multiple layers can be formed. Further, of these treatments, the hydrothermal denaturation treatment and the anodization treatment are treatments in which the surface of the metal foil is dissolved with a treatment agent to form a metal compound excellent in corrosion resistance. The definition of the chemical conversion treatment may include these treatments. When the barrier layer 3 is provided with the corrosion-resistant film, the barrier layer 3 is regarded as including the corrosion-resistant film.

The corrosion-resistant film exhibits the effects of preventing delamination between the barrier layer (e.g. an aluminum alloy foil) and the base material layer during molding of the exterior material for electrical storage devices; preventing dissolution and corrosion of the surface of the barrier layer, particularly dissolution and corrosion of aluminum oxide present on the surface of the barrier layer when the barrier layer is an aluminum alloy foil, by hydrogen fluoride generated by reaction of an electrolyte with moisture; improving the bondability (wettability) of the surface of the barrier layer; preventing delamination between the base material layer and the barrier layer during heat-sealing; and preventing delamination between the base material layer and the barrier layer during molding.

Various corrosion-resistant films formed by chemical conversion treatment are known, and examples thereof include mainly corrosion-resistant films containing at least one of a phosphate, a chromate, a fluoride, a triazine thiol compound, and a rare earth oxide. Examples of the chemical conversion treatment using a phosphate or a chromate include chromic acid chromate treatment, phosphoric acid chromate treatment, phosphoric acid-chromate treatment and chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Examples of the phosphorus compound used in these treatments include sodium phosphate, potassium phosphate, ammonium phosphate and polyphosphoric acid. Examples of the chromate treatment include etching chromate treatment, electrolytic chromate treatment and coating-type chromate treatment, and coating-type chromate treatment is preferable. This coating-type chromate treatment is treatment in which at least a surface of the barrier layer (e.g. an aluminum alloy foil) on the inner layer side is first degreased by a well-known treatment method such as an alkali immersion method, an electrolytic cleaning method, an acid cleaning method, an electrolytic acid cleaning method or an acid activation method, and a treatment solution containing a metal phosphate such as Cr (chromium) phosphate, Ti (titanium) phosphate, Zr (zirconium) phosphate or Zn (zinc) phosphate or a mixture of these metal salts as a main component, a treatment solution containing any of non-metal salts of phosphoric acid and a mixture of these non-metal salts as a main component, or a treatment solution formed of a mixture of any of these salts and a synthetic resin or the like is then applied to the degreased surface by a well-known coating method such as a roll coating method, a gravure printing method or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Examples of the resin component used here include polymers such as phenol-based resins and acryl-based resins, and examples of the treatment include chromate treatment using an aminated phenol polymer having any of repeating units represented by the following general formulae (1) to (4). In the aminated phenol polymer, the repeating units represented by the following general formulae (1) to (4) may be contained alone, or may be contained in combination of two or more thereof. The acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

[Chemical Formula 1]

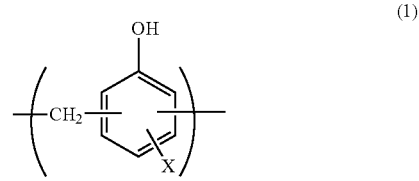

[Chemical Formula 2]

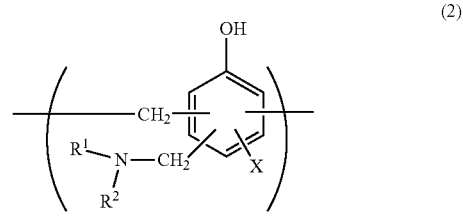

[Chemical Formula 3]

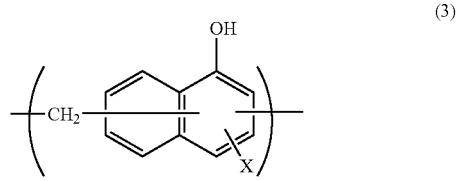

[Chemical Formula 4]

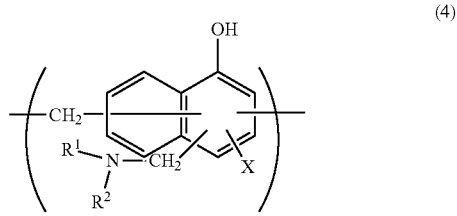

In the general formulae (1) to (4), X represents a hydrogen atom, a hydroxy group, an alkyl group, a hydroxyalkyl group, an allyl group, or a benzyl group. $R^1$ and $R^2$ are the same or different, and each represents a hydroxy group, an alkyl group, or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group, and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxy group or a hydroxyalkyl group. A number average molecular weight of the aminated phenol polymer having repeating units represented by the general formulae (1) to (4) is preferably about 500 to 1,000,000, and more preferably about 1,000 to 20,000, for example. The aminated phenol polymer is produced by, for example, performing polycondensation of a phenol compound or a naphthol compound with formaldehyde to prepare a polymer including repeating units represented by the general formula (1) or the general formula (3), and then introducing a functional group (—$CH_2NR^1R^2$) into the obtained polymer using formaldehyde and an amine ($R^1R^2NH$). The aminated phenol polymers are used alone, or used in combination of two or more thereof.

Other examples of the corrosion-resistant film include thin films formed by corrosion prevention treatment of coating type in which a coating agent containing at least one selected from the group consisting of a rare earth element oxide sol, an anionic polymer and a cationic polymer is applied. The coating agent may further contain phosphoric acid or a phosphate, and a crosslinker for crosslinking the polymer. In the rare earth element oxide sol, fine particles of a rare earth element oxide (e.g. particles having an average particle diameter of 100 nm or less) are dispersed in a liquid dispersion medium. Examples of the rare earth element oxide include cerium oxide, yttrium oxide, neodymium oxide and lanthanum oxide, and cerium oxide is preferable from the viewpoint of further improving adhesion. The rare earth element oxides contained in the corrosion-resistant film can be used alone, or used in combination of two or more thereof. As the liquid dispersion medium for the rare earth element oxide, for example, various solvents such as water, an alcohol-based solvent, a hydrocarbon-based solvent, a ketone-based solvent, an ester-based solvent, and an ether-based solvent can be used, and water is preferable. For example, the cationic polymer is preferably polyethyleneimine, an ion polymer complex formed of a polymer having polyethyleneimine and a carboxylic acid, primary amine-grafted acrylic resins obtained by graft-polymerizing a primary amine with an acrylic main backbone, polyallylamine or a derivative thereof, or aminated phenol. The anionic polymer is preferably poly (meth)acrylic acid or a salt thereof, or a copolymer containing (meth)acrylic acid or a salt thereof as a main component. The crosslinker is preferably at least one selected from the group consisting of a silane coupling agent and a compound having any of functional groups including an isocyanate group, a glycidyl group, a carboxyl group and an oxazoline group. In addition, the phosphoric acid or phosphate is preferably condensed phosphoric acid or a condensed phosphate.

Examples of the corrosion-resistant film include films formed by applying a dispersion of fine particles of a metal oxide such as aluminum oxide, titanium oxide, cerium oxide or tin oxide or barium sulfate in phosphoric acid to the surface of the barrier layer and performing baking treatment at 150° C. or higher.

The corrosion-resistant film may have a laminated structure in which at least one of a cationic polymer and an anionic polymer is further laminated if necessary. Examples of the cationic polymer and the anionic polymer include those described above.

The composition of the corrosion-resistant film can be analyzed by, for example, time-of-flight secondary ion mass spectrometry.

The amount of the corrosion-resistant film to be formed on the surface of the barrier layer 3 in the chemical conversion treatment is not particularly limited, but for example when the coating-type chromate treatment is performed, and it is desirable that the chromic acid compound be contained in an amount of, for example, about 0.5 to 50 mg, preferably about 1.0 mg to 40 mg, in terms of chromium, the phosphorus compound be contained in an amount of, for example, about 0.5 to 50 mg, preferably about 1.0 to 40 mg, in terms of phosphorus, and the aminated phenol polymer be contained in an amount of, for example, about 1.0 to 200 mg, preferably about 5.0 mg to 150 mg, per 1 $m^2$ of the surface of the barrier layer 3.

The thickness of the corrosion-resistant film is not particularly limited, and is preferably about 1 nm to 20 μm, more preferably about 1 nm to 100 nm, still more preferably about 1 nm to 50 nm from the viewpoint of the cohesive force of the film and the adhesive strength with the barrier layer and the heat-sealable resin layer. The thickness of the corrosion-resistant film can be measured by observation with a transmission electron microscope or a combination of observation with a transmission electron microscope and energy dispersive X-ray spectroscopy or electron beam energy loss spectroscopy. By analyzing the composition of the corrosion-resistant film using time-of-flight secondary ion mass spectrometry, peaks derived from secondary ions from, for example, Ce, P and O (e.g. at least one of $Ce_2PO_4^+$, $CePO_4^-$ and the like) and secondary ions from, for example, Cr, P and O (e.g. at least one of $CrPO_2^+$, $CrPO_4^-$ and the like) are detected.

The chemical conversion treatment is performed in the following manner: a solution containing a compound to be used for formation of a corrosion-resistant film is applied to the surface of the barrier layer by a bar coating method, a roll coating method, a gravure coating method, an immersion method or the like, and heating is then performed so that the temperature of the barrier layer is about 70 to about 200° C. The barrier layer may be subjected to a degreasing treatment by an alkali immersion method, an electrolytic cleaning method, an acid cleaning method, an electrolytic acid cleaning method or the like before the barrier layer is subjected to a chemical conversion treatment. When a degreasing treatment is performed as described above, the chemical conversion treatment of the surface of the barrier layer can be further efficiently performed. When an acid degreasing agent with a fluorine-containing compound dissolved in an inorganic acid is used for degreasing treatment, not only a metal foil degreasing effect can be obtained but also a metal fluoride can be formed as a passive state, and in this case, only degreasing treatment may be performed.

[Heat-Sealable Resin Layer 4]

In the exterior material for electrical storage devices of the present disclosure, the heat-sealable resin layer 4 is a layer (sealant layer) which corresponds to an innermost layer and performs a function of hermetically sealing the electrical storage device element by heat-sealing the heat-sealable resin layer during construction of the electrical storage device.

The resin forming the heat-sealable resin layer 4 is not particularly limited as long as it can be heat-sealed, a resin containing a polyolefin skeleton such as a polyolefin or an acid-modified polyolefin is preferable. The resin forming the heat-sealable resin layer 4 can be confirmed to contain a polyolefin backbone by an analysis method such as infrared spectroscopy or gas chromatography-mass spectrometry. In addition, it is preferable that a peak derived from maleic anhydride is detected when the resin forming the heat-sealable resin layer 4 is analyzed by infrared spectroscopy. For example, when a maleic anhydride-modified polyolefin is measured by infrared spectroscopy, peaks derived from maleic anhydride are detected near wavenumbers of 1760 $cm^{-1}$ and 1780 $cm^{-1}$. When the heat-sealable resin layer 4 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Of these, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers forming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

The heat-sealable resin layer 4 may be formed from one resin alone, or may be formed from a blend polymer obtained by combining two or more resins. Further, the heat-sealable resin layer 4 may be composed of only one layer, or may be composed of two or more layers with the same resin component or different resin components.

The heat-sealable resin layer 4 may contain a slipping agent etc. if necessary. When the heat-sealable resin layer 4 contains a slipping agent, occurrence of pinholes and cracking during molding of the exterior material for electrical storage devices can be suppressed. The slipping agent is not particularly limited, and a known slipping agent can be used. The slipping agents may be used alone, or may be used in combination of two or more thereof.

The slipping agent is not particularly limited, and is preferably an amide-based slipping agent. Specific examples of the slipping agent include those exemplified for the base material layer 1. The slipping agents may be used alone, or may be used in combination of two or more thereof.

When a slipping agent is present on the surface of the heat-sealable resin layer 4, the amount of the slipping agent present is not particularly limited, and is preferably about 10 to 50 $mg/m^2$, more preferably about 15 to 40 $mg/m^2$ from the viewpoint of suppressing occurrence of pinholes and cracking during molding of the exterior material for electrical storage devices.

The slipping agent present on the surface of the heat-sealable resin layer 4 may be one obtained by exuding the slipping agent contained in the resin forming the heat-sealable resin layer 4, or one obtained by applying a slipping agent to the surface of the heat-sealable resin layer 4.

The thickness of the heat-sealable resin layer 4 is not particularly limited as long as the heat-sealable resin layers are heat-sealed to each other to perform a function of sealing the electrical storage device element, and the thickness is, for example, about 100 μm or less, preferably about 85 μm or less, more preferably about 15 to 85 μm. For example, when the thickness of the adhesive layer 5 described later is 10 μm or more, the thickness of the heat-sealable resin layer 4 is preferably about 85 μm or less, more preferably about 15 to 45 μm. For example, when the thickness of the adhesive layer 5 described later is less than 10 μm or the adhesive layer 5 is not provided, the thickness of the heat-sealable resin layer 4 is preferably about 20 μm or more, more preferably about 35 to 85 μm.

[Adhesive Layer 5]

In the exterior material for electrical storage devices of the present disclosure, the adhesive layer 5 is a layer provided between the barrier layer 3 (or corrosion-resistant film) and the heat-sealable resin layer 4 if necessary for firmly bonding these layers to each other.

The adhesive layer 5 is formed from a resin capable of bonding the barrier layer 3 and the heat-sealable resin layer 4 to each other. The resin to be used for forming the adhesive layer 5 is, for example, the same as that of the adhesive exemplified for the adhesive agent layer 2. Preferably, the resin to be used for forming the adhesive layer 5 contains a polyolefin backbone. Examples thereof include the polyolefins and acid-modified polyolefins exemplified for the heat-sealable resin layer 4 described above. The resin forming the adhesive layer 5 can be confirmed to contain a polyolefin backbone by an analysis method such as infrared spectroscopy, gas chromatography-mass spectrometry, and the analysis method is not particularly limited. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wavenumbers of 1760 cm$^{-1}$ and 1780 cm$^{-1}$. However, if the degree of acid modification is low, the peaks may be too small to be detected. In that case, the peaks can be analyzed by nuclear magnetic resonance spectroscopy.

From the viewpoint of firmly bonding the barrier layer 3 and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining an exterior material for electrical storage devices excellent in shape stability after molding while decreasing the thickness of the exterior material for electrical storage devices, the adhesive layer 5 is more preferably a cured product of a resin composition containing an acid-modified polyolefin and a curing agent. Preferred examples of the acid-modified polyolefin include those described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin. As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, time-of-flight secondary ion mass spectrometry (TOF-SIMS) and the like.

From the viewpoint of further improving adhesion between the barrier layer 3 and the adhesive layer 5, the adhesive layer 5 is preferably a cured product of a resin composition containing a curing agent having at least one selected from the group consisting of an oxygen atom, a heterocyclic ring, a C=N bond, and a C—O—C bond. Examples of the curing agent having a heterocyclic ring include curing agents having an oxazoline group, and curing agents having an epoxy group. Examples of the curing agent having a C=N bond include curing agents having an isocyanate group and curing agents having an oxazoline group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer 3 and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain. Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2,000, more preferably about 100 to 1,000, still more preferably about 200 to 800. In the first present disclosure, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5 in an atmosphere including a component which induces corrosion of the barrier layer, such as an electrolytic solution.

When the adhesive layer 5 is a cured product of a resin composition containing at least one selected from the group consisting of a compound having an isocyanate group, a compound having an oxazoline group and an epoxy resin, and the acid-modified polyolefin, the acid-modified polyolefin functions as a main agent, and the compound having an isocyanate group, the compound having an oxazoline group, and the compound having an epoxy group each function as a curing agent.

The thickness of the adhesive layer 5 is preferably about 50 µm or less, about 40 µm or less, about 30 µm or less, about 20 µm or less, or about 5 µm or less for the upper limit, and preferably about 0.1 µm or more or about 0.5 µm or more for the lower limit, and is preferably in the range of about 0.1 to 50 µm, about 0.1 to 40 µm, about 0.1 to 30 µm, about 0.1 to 20 µm, about 0.1 to 5 µm, about 0.5 to 50 µm, about 0.5 to 40 µm, about 0.5 to 30 µm, about 0.5 to 20 µm or about 0.5 to 5 µm. More specifically, the thickness is preferably about 1 to 10 µm, more preferably about 1 to 5 µm in the case of the adhesive exemplified for the adhesive agent layer 2 or a cured product of an acid-modified polyolefin with a curing agent. When any of the resins exemplified for the heat-sealable resin layer 4 is used, the thickness of the adhesive layer is preferably about 2 to 50 µm, more preferably about 10 to 40 µm. For example, when the adhesive layer 5 is formed from an acid-modified polyolefin, the thickness of the adhesive layer 5 is preferably about 2 µm or more, more preferably 5 µm or more, still more preferably 8 µm or more. For example, when the adhesive layer 5 is formed from an acid-modified polyolefin, the thickness of the adhesive layer 5 is preferably about 50 µm or less, more preferably 40 µm or less. For example, when the adhesive layer 5 is formed from an acid-modified polyolefin, the thickness of the adhesive layer 5 is preferably in the range of about 2 to 50 µm, about 2 to 40 µm, about 5 to 50 µm, about 5 to 40 µm, about 8 to 50 µm, or about 8 to 40 µm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When the resin exemplified for the heat-sealable resin layer 4 is used, for example, extrusion molding of the heat-sealable resin layer 4 and the adhesive layer 5 can be performed.

3. Method for Manufacturing Exterior Material for Electrical Storage Devices

The method for manufacturing an exterior material for electrical storage devices is not particularly limited as long as a laminate is obtained in which the layers of the exterior material for electrical storage devices of the present invention are laminated. Examples thereof include a method including the step of preparing a laminate in which at least the surface coating layer 6, the base material layer 1, the barrier layer 3 and the heat-sealable resin layer 4 are laminated in this order from the outside. Specifically, the method for manufacturing an exterior material for electrical storage devices according to the present disclosure includes the step of preparing a laminate in which at least the surface coating layer 6, the base material layer 1, the barrier layer 3 and the heat-sealable resin layer 4 are laminated in this order from the outside. The surface coating layer 6 contains a resin and a filler, and the logarithmic decrement ΔE of the outer surface of the surface coating layer 6 of the laminate is 0.43 or less at 200° C. in measurement with a rigid body pendulum.

An example of the method for manufacturing the exterior material for electrical storage devices of the present invention is as follows. First, a laminate including the base material layer 1, the adhesive agent layer 2 and the barrier layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the barrier layer 3, the surface of which is subjected to a chemical conversion treatment if necessary, using a coating method such as a gravure coating method or a roll coating method, and dried, the barrier layer 3 or the base material layer 1 is then laminated, and the adhesive agent layer 2 is cured.

Then, the heat-sealable resin layer 4 is laminated on the barrier layer 3 of the laminate A. When the heat-sealable resin layer 4 is laminated directly on the barrier layer 3, the heat-sealable resin layer 4 may be laminated onto the barrier layer 3 of the laminate A by a method such as a thermal lamination method or an extrusion lamination method. When the adhesive layer 5 is provided between the barrier layer 3 and the heat-sealable resin layer 4, mention is made of, for example, (1) a method in which the adhesive layer 5 and the heat-sealable resin layer 4 are extruded to be laminated on the barrier layer 3 of the laminate A (extrusion lamination method or tandem lamination method); (2) a method in which the adhesive layer 5 and the heat-sealable resin layer 4 are laminated to form a laminate separately, and the laminate is laminated on the barrier layer 3 of the laminate A by a thermal lamination method, or a method in which a laminate with the adhesive layer 5 laminated on the barrier layer 3 of the laminate A is formed, and laminated to the heat-sealable resin layer 4 by a thermal lamination method; (3) a method in which the melted adhesive layer 5 is poured between the barrier layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination); and (4) an adhesive for forming the adhesive layer 5 is applied by solution coating and dried or baked to laminate the adhesive on the barrier layer 3 of the laminate A, and the heat-sealable resin layer 4 formed in a sheet shape in advance is laminated on the adhesive layer 5.

Next, the surface coating layer 6 is laminated on a surface of the base material layer 1 on a side opposite to the barrier layer 3. The surface coating layer 6 can be formed by, for example, applying the resin composition for forming the surface coating layer 6 to the surface of the base material layer 1, and curing the resin composition. The order of the step of laminating the barrier layer 3 on a surface of the base material layer 1 and the step of laminating the surface coating layer 6 on a surface of the base material layer 1 is not particularly limited. For example, the surface coating layer 6 may be formed on a surface of the base material layer 1, followed by forming the barrier layer 3 on a surface of the base material layer 1 on a side opposite to the surface coating layer 6.

As described above, a laminate including the surface coating layer 6, the base material layer 1, the adhesive agent layer 2 provided if necessary, the barrier layer 3, the adhesive layer 5 provided if necessary, and the heat-sealable resin layer 4 in this order from the outside is formed, and the laminate may be further subjected to a heating treatment for strengthening the bondability of the adhesive agent layer 2 and the adhesive layer 5 provided if necessary. As described above, a colored layer may be provided between the base material layer 1 and the barrier layer 3.

4. Uses of Exterior Material for Electrical Storage Devices

The exterior material for electrical storage devices of the present disclosure is used as a packaging for hermetically sealing and storing electrical storage device elements such as a positive electrode, a negative electrode and an electrolyte. That is, in a packaging formed of the exterior material for electrical storage devices, an electrical storage device element including at least a positive electrode, a negative electrode and an electrolyte can be stored to obtain a battery.

Specifically, an electrical storage device element including at least a positive electrode, a negative electrode and an electrolyte is covered with the exterior material for electrical storage devices of the present disclosure such that a flange portion (region where a heat-sealable resin layer is in contact with itself) can be formed on the periphery of the electrical storage device element while a metal terminal connected to each of the positive electrode and the negative electrode protrudes to the outside, and the heat-sealable resin layer at the flange portion is heat-sealed with itself, thereby providing an electrical storage device using the exterior material for electrical storage devices. When the electrical storage device element is stored in the packaging formed of the exterior material for electrical storage devices of the present disclosure, the packaging is formed in such a manner that the heat-sealable resin portion of the exterior material for electrical storage devices of the present disclosure is on the inner side (a surface contacting the electrical storage device element).

The exterior material for electrical storage devices according to the present disclosure can be suitably used for electrical storage devices such as batteries (including condensers, capacitors and the like). The exterior material for electrical storage devices of the present disclosure may be used for either primary batteries or secondary batteries, and is preferably used for secondary batteries. The type of a secondary battery to which the exterior material for electrical storage devices according to the present disclosure is applied is not particularly limited, and examples thereof include lithium ion batteries, lithium ion polymer batteries, solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, preferred subjects to which the exterior material for electrical storage devices according to the present disclosure is applied include lithium ion batteries and lithium ion polymer batteries.

EXAMPLES

Hereinafter, the present disclosure will be described in detail by way of examples and comparative examples. However, the present disclosure is not limited to examples.

<Manufacturing of Exterior Material for Electrical Storage Devices>

Example 1

A stretched nylon (ONy) film (thickness: 15 μm) was prepared as a base material layer. In addition, an aluminum foil (JIS H4160: 1994A 8021 H-O (thickness: 35 μm)) was prepared as a barrier layer. Next, the barrier layer and the base material layer were laminated by a dry lamination method using an adhesive (two-liquid urethane adhesive containing a colorant) as described later, and aging treatment was then performed to prepare a laminate of base material layer/adhesive agent layer/barrier layer. Both surfaces of the aluminum foil are subjected to chemical conversion treatment. The chemical conversion treatment of the aluminum foil was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry mass), and performing baking.

Next, maleic anhydride-modified polypropylene as an adhesive layer (thickness: 20 μm) and random polypropylene as a heat-sealable resin layer (thickness: 20 μm) were co-extruded onto the barrier layer of the obtained laminate of the layers to laminate an adhesive layer and a heat-sealable resin layer on the barrier layer. Further, the following resin composition 1 was applied to the surface of the base material layer of the obtained laminate to a thickness of 3 μm, and cured under the formation conditions of an environment at a temperature of 40° C. to 100° C. and 3 days to form a matte-toned surface coating layer, so that an exterior material for electrical storage devices was obtained which included a laminate (total thickness: 96 μm) in which a surface coating layer (3 μm), a base material layer (thickness: 15 μm), an adhesive agent layer (3 μm), a barrier layer (35 μm), an adhesive layer (20 μm) and a heat-sealable resin layer (20 μm) were laminated in this order from the outside.

Examples 2 to 4

Except that instead of the resin composition 1, the following resin compositions 2 to 4 were used to form surface coating layers, respectively, in formation of the surface coating layer, the same procedure as in Example 1 was carried out to obtain exterior materials for electrical storage devices.

Example 5

Except that instead of the resin composition 1, the following resin composition 5 was used to form a surface coating layer in formation of the surface coating layer, the same procedure as in Example 1 was carried out to obtain an exterior material for electrical storage devices.

Example 6

Except that instead of the resin composition 1, the following resin composition 6 was used to form a surface coating layer in formation of the surface coating layer, the same procedure as in Example 1 was carried out to obtain an exterior material for electrical storage devices.

Example 7

Except that instead of the resin composition 1, the following resin composition 7 was used to form a surface coating layer in formation of the surface coating layer, the same procedure as in Example 1 was carried out to obtain an exterior material for electrical storage devices.

Comparative Example 1

Except that instead of the resin composition 1, the following resin composition 8 was used to form a surface coating layer in formation of the surface coating layer, the same procedure as in Example 1 was carried out to obtain an exterior material for electrical storage devices.

<Resin Composition Used for Formation of Surface Coating Layer and Formation Conditions>

(Resin Composition 1 (used in Example 1)) Resin composition containing a resin (polyurethane formed from a mixture of two polyol compounds and an aromatic isocyanate-based compound), an inorganic filler (silica particles having an average particle diameter of 1 µm), an organic filler (average particle diameter: 2 µm), and an olefin-based wax.

(Resin Composition 2 (used in Example 2))

Resin composition containing a resin (polyurethane formed from a mixture of two polyol compounds and an aliphatic isocyanate-based compound), an inorganic filler (silica particles having an average particle diameter of 1 µm), an organic filler (average particle diameter: 2 µm), and an olefin-based wax.

(Resin Composition 3 (used in Example 3))

Resin composition containing a resin (polyurethane formed from a mixture of two polyol compounds and an aromatic isocyanate-based compound (the blending ratio of two polyol compounds is changed from that in the resin composition 1), an inorganic filler (silica particles having an average particle diameter of 1 µm), an organic filler (average particle diameter: 2 µm), and an olefin-based wax.

(Resin Composition 4 (used in Example 4))

Resin composition containing a resin (polyurethane formed from a mixture of three polyol compounds and an aromatic isocyanate-based compound), an inorganic filler (silica particles having an average particle diameter of 1 µm), an organic filler (average particle diameter: 2 µm), and an olefin-based wax.

(Resin Composition 5 (used in Example 5))

Resin composition which is the same as the resin composition of Example 3 except that the content of the olefinic wax is reduced to ¼.

(Resin Composition 6 (used in Example 6))

Resin composition which is the same as the resin composition of Example 3 except that the content of the olefinic wax is reduced to ⅛.

(Resin Composition 7 (used in Example 7))

Resin composition which is the same as the resin composition of Example 3 except that the olefin wax is not present.

(Resin Composition 8 (used in Comparative Example 1))

The same material as in Example 1 was used except that an aromatic isocyanate-based compound different from that in Example 1 was used.

[Measurement of Logarithmic Decrement ΔE of Outer Surface of Surface Coating Layer]

The obtained exterior material for electrical storage devices was cut into a rectangle having a width of 15 mm (TD: Transverse Direction) and a length of 50 mm (MD: Machine Direction) to obtain a test sample. A rigid body pendulum physical property tester (model: RPT-3000W manufactured by A&D Company, Limited) was used, FRB-100 was used for a frame of the pendulum, cylindrical cylinder edge RBP-080 was used for the edge portion, and the initial amplitude was set to about 0.3 degrees. The pendulum was placed in such a manner that the central axis direction of the cylindrical cylinder and the MD of the test sample were orthogonal to each other. In addition, for preventing floating and warpage of the test sample during measurement, a kapton tape was attached to the test sample at a position having no effect on measurement results, and fixed. The cylindrical cylinder edge was brought into contact with the outer surface of the surface coating layer. Next, the logarithmic decrement ΔE of the surface coating layer was measured in a temperature range of 30° C. to 200° C. at a temperature rise rate of 3° C./min using a cold block CHB-100. A logarithmic decrement ΔE was adopted at which the temperature of the surface coating layer of the test sample was 200° C. An average of two measurements (N=2) made by using an unused cut sample rather than using a test sample once measured was used. Table 1 shows the results. The measurement result was rounded off to the second decimal place.

[Hardness Measured by Nanoindentation Method in 23° C. Environment]

The hardness was measured using a nanoindenter ("TI 950 TriboIndenter" manufactured by HYSITRON Inc.) as an apparatus. As the indenter of the nanoindenter, a Berkovich indenter (TI-0039) was used. First, in an environment at 23° C. and a relative humidity of 50%, the indenter was applied to a surface of the surface coating layer of the exterior material for electrical storage devices (a surface on which the surface coating layer is exposed and in a direction perpendicular to a laminating direction of each layer (see a thickness direction W in FIGS. 1 to 3)), the indenter was pushed into the surface coating layer from the surface to a load of 50 N over 10 seconds, and held in this state for 5 seconds, and the load was removed over 10 seconds. An average value of measurements (N=5) performed while changing measurement spots was defined as a hardness. Table 1 shows the results. The surface into which the indenter is pushed is a resin portion in which a cross-section of the surface coating layer (a cross-section of the surface coating layer in the thickness direction) is exposed, the cross-section being obtained by cutting the resin portion in the thickness direction so as to pass through a central portion (which may be near the center) of the exterior material for electrical storage devices. In the measurement of the hardness of the surface coating layer, the portion into which the indenter is pushed is a portion (resin portion) in which a filler is not present on the surface of the surface coating layer. The measurement result was rounded off to the first decimal place. The organic fillers contained in the surface coating layers in Examples 1 to 7 and Comparative Example 1 were the same, and for the surface coating layer in Example 2, the hardness measured by pushing the indenter into a portion having the organic filler was 496.1 MPa. The cutting was performed using a commercially available rotary microtome.

[Evaluation on Matte-Toned Design after Thermal Sealing]

Figure 4:
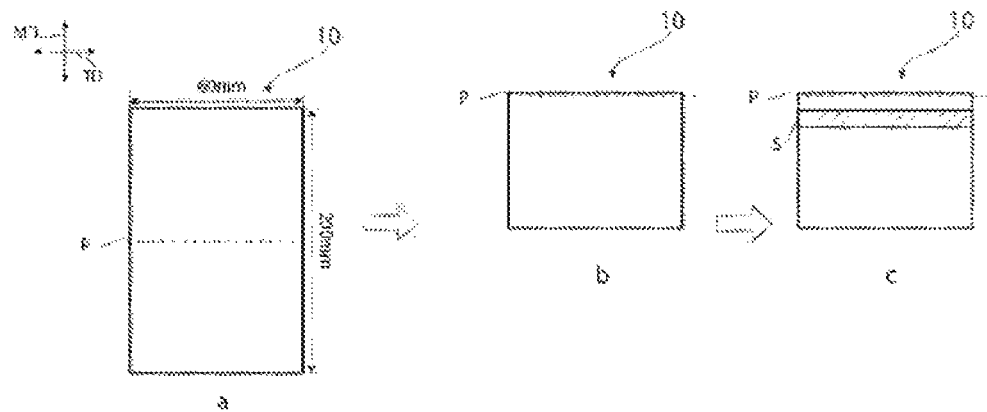
FIG. 4 is a schematic view for illustrating a method for evaluation on a matte-toned design after thermal sealing.
Figure 5:
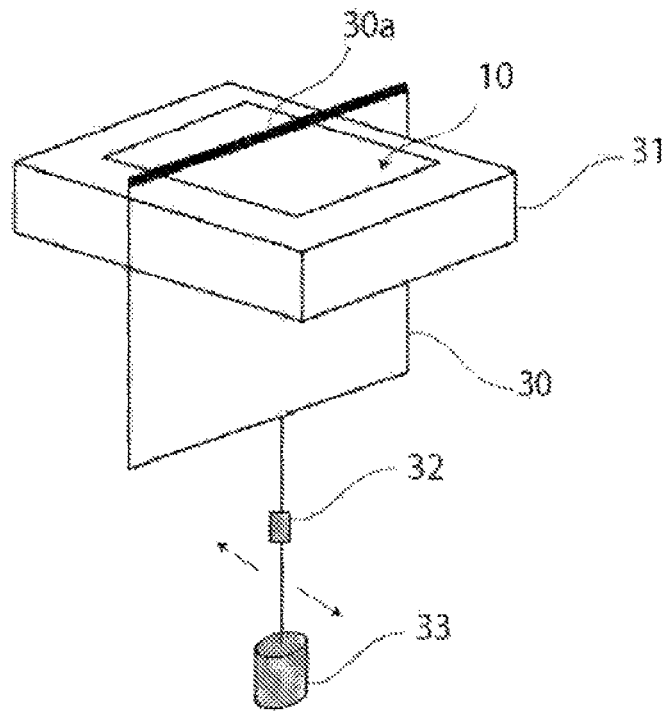
FIG. 5 is a schematic diagram for illustrating a method for measuring a logarithmic decrement $\Delta E$ in measurement with a rigid pendulum.

As shown in the schematic diagram of FIG. 4, each exterior material for electrical storage devices was cut to a size of 60 mm (transverse direction)×200 mm (machine direction) (FIG. 4a). Next, the exterior material for electrical storage devices was double-folded in the machine direction at the position of the fold P (intermediate in the machine direction) in such a manner that the heat-sealable resin layers faced each other (FIG. 4b). Next, the heat-sealable resin layers were heat-sealed on the inner side in the machine direction by about 10 mm from the fold P under the conditions of a heat seal width of 7 mm, a temperature of 210° C., a surface pressure of 0.5 MPa and 6 seconds (FIG. 4c). The shaded portion S is a thermal sealing portion. The difference in surface gloss between the shaded portion and a portion other than the shaded portion was visually examined, and the matte-toned design after thermal sealing was evaluated according to the following criteria. Table 1 shows the results.

A: The matte-toned design before thermal sealing was well retained in the thermally sealed portion.

B: There was a gloss depending on an angle at which the thermal seal portion was viewed, and the matte-toned design before the thermal sealing was slightly deteriorated.

C: The thermal seal had a gloss, and the matte-toned design before thermal sealing was impaired.

[Moldability]

Each exterior material for electrical storage devices was cut to a rectangle having a length of 90 mm (MD) and a width of 150 mm (TD) to obtain a test sample. The MD of the exterior material for electrical storage devices corresponds to the rolling direction (RD) of the aluminum alloy foil, the TD of the exterior material for electrical storage devices corresponds to the TD of the aluminum alloy foil. Using a rectangular mold having an opening size of 31.6 mm (MD)×54.5 mm (TD) (female; the surface has a surface roughness in maximum height (nominal value of Rz) of 3.2 μm as specified in Appendix 1 (Reference) of JIS B 0659-1: 2002, Comparative Surface Roughness Standard Specimen, Table 2; corner R: 2.0 mm; ridge line R: 1.0 mm), a corresponding mold (male; surface of the ridge portion has a surface roughness in maximum height (nominal value of Rz) of 1.6 μm as specified in Appendix 1 (Reference) of JIS B 0659-1: 2002, Comparative Surface Roughness Standard Specimen, Table 2; surface other than that of the ridge portion has a surface roughness in maximum height (nominal value of Rz) of 3.2 μm as specified in Appendix 1 (Reference) of JIS B 0659-1: 2002, Comparative Surface Roughness Standard Specimen, Table 2; corner R: 2.0 mm; ridge line R: 1.0 mm), the sample was subjected to cold molding (draw molding in one stage) at a molding depth of 5 mm under a pressing pressure (surface pressure) of 0.9 MPa in an environment at 25° C. This procedure was carried out for 10 test samples. At this time, the molding was performed with the test sample placed on the female mold so that the heat-sealable resin layer was located on the male mold side. The male mold and the female mold had a clearance of 0.3 mm. For each of the test samples after cold molding, the matte-toned design after the molding was evaluated according to the following criteria. The criteria for the following evaluations A to C were all applied when 6 or more (more than half) of the 10 test samples satisfied these evaluation criteria. Table 1 shows the results.

A: After molding, the matte-toned design was well retained, and the surface coating layer was not either cracked or peeled.

B: After molding, the surface coating layer was not either cracked or peeled, but the surface of the surface coating layer had a gloss, so that the matte-toned design was impaired.

C: After molding, the surface of the surface coating layer had a gloss, so that the matte-toned design was impaired, and the surface coating layer was cracked or peeled.

TABLE 1

| | Surface coating layer | | Evaluation on | |
| --- | --- | --- | --- | --- |
| | Logarithmic decrement ΔE at 200° C. | Hardness measured by nanoindentation method in environment at 23° C. (MPa) | matte-toned design after thermal sealing | Moldability |
| Example 1 | 0.39 | 306.8 | A | A |
| Example 2 | 0.37 | 218.1 | A | A |
| Example 3 | 0.12 | 271.7 | A | A |
| Example 4 | 0.09 | — | A | A |
| Example 5 | 0.10 | 233.3 | A | A |
| Example 6 | 0.11 | 270.0 | A | A |
| Example 7 | 0.09 | 243.3 | A | A |
| Comparative Example 1 | 0.47 | 423.3 | C | C |

In the exterior materials for electrical storage devices in Examples 1 to 7, the surface coating layer contains a resin and a filler, and the logarithmic decrement ΔE of the outer surface of surface covering layer of the laminate is 0.43 or less at 200° C. in measurement with a rigid body pendulum. In the exterior material for electrical storage devices in Examples 1 to 7, the matte-toned design from a surface coating layer containing a filler is inhibited from being impaired by thermal sealing.

As described above, the present disclosure provides the invention of aspects as shown below.

Item 1. An exterior material for electrical storage devices including a laminate including at least a surface coating layer, a base material layer, a barrier layer and heat-sealable resin layer in this order from the outside, in which the surface coating layer contains a resin and a filler, and the logarithmic decrement ΔE of the outer surface of the surface coating layer of the laminate is 0.43 or less at 200° C. in measurement with a rigid body pendulum.

Item 2. The exterior material for electrical storage devices according to item 1, in which the hardness of a resin of the surface coating layer is 420.4 MPa or less as measured on a cross-section of the surface coating layer in a thickness direction in an environment of 23° C. by a nanoindentation method.

Item 3. The exterior material for electrical storage devices according to item 1 or 2, in which the hardness of a filler of the surface coating layer is 300.0 MPa or more as measured on a cross-section of the surface coating layer in a thickness direction in an environment of 23° C. by a nanoindentation method.

Item 4. The exterior material for electrical storage devices according to any one of items 1 to 3, including an adhesive agent layer between the base material layer and the barrier layer.

Item 5. The exterior material for electrical storage devices according to item 4, in which the adhesive agent layer is colored.

Item 6. The exterior material for electrical storage devices according to any one of items 1 to 5, including a colored layer between the base material layer and the barrier layer.

Item 7. A method for manufacturing an exterior material for electrical storage devices, the method including the step of preparing a laminate in which at least the surface coating layer, the base material layer, the barrier layer and the heat-sealable resin layer are laminated in this order from the outside, in which the surface coating layer contains a resin and a filler, and the logarithmic decrement ΔE of the outer surface of the surface coating layer of the laminate is 0.43 or less at 200° C. in measurement with a rigid body pendulum.

Item 8. An electrical storage device in which an electrical storage device element including at least a positive electrode, a negative electrode and an electrolyte is stored in a packaging formed of the exterior material for electrical storage devices according to any one of items 1 to 6.

DESCRIPTION OF REFERENCE SIGNS

1: Base material layer
2: Adhesive agent layer
3: Barrier layer
4: Heat-sealable resin layer
5: Adhesive layer
6: Surface coating layer
10: Exterior material for electrical storage devices
30: Pendulum
30a: Cylindrical cylinder edge
31: Cold block
32: Vibration displacement detector
33: Weight

The invention claimed is:

1. An exterior material for electrical storage devices comprising a laminate including at least a surface coating layer, a base material layer, a barrier layer and heat-sealable resin layer in this order from the outside, wherein the surface coating layer contains a resin and a filler, and the logarithmic decrement ΔE of the outer surface of the surface coating layer of the laminate is 0.43 or less at 200° C. in measurement with a rigid body pendulum.

2. The exterior material for electrical storage devices according to claim 1, wherein the hardness of the resin of the surface coating layer is 420.4 MPa or less as measured on a cross-section of the surface coating layer in a thickness direction in an environment of 23° C. by a nanoindentation method.

3. The exterior material for electrical storage devices according to claim 1, wherein the hardness of the filler of the surface coating layer is 300.0 MPa or more as measured on a cross-section of the surface coating layer in a thickness direction in an environment of 23° C. by a nanoindentation method.

4. The exterior material for electrical storage devices according to claim 1, comprising an adhesive agent layer between the base material layer and the barrier layer.

5. The exterior material for electrical storage devices according to claim 4, wherein the adhesive agent layer is colored.

6. The exterior material for electrical storage devices according to claim 1, comprising a colored layer between the base material layer and the barrier layer.

7. A method for manufacturing an exterior material for electrical storage devices, the method comprising the step of preparing a laminate in which at least the surface coating layer, the base material layer, the barrier layer and the heat-sealable resin layer are laminated in this order from the outside, in which the surface coating layer contains a resin and a filler, and the logarithmic decrement ΔE of the outer surface of the surface coating layer of the laminate is 0.43 or less at 200° C. in measurement with a rigid body pendulum.

8. An electrical storage device in which an electrical storage device element including at least a positive electrode, a negative electrode and an electrolyte is stored in a packaging formed of the exterior material for electrical storage devices according to claim 1.

9. The exterior material for electrical storage devices according to claim 1, wherein the hardness of the resin of the surface coating layer is 233.3 MPa or more as measured on a cross-section of the surface coating layer in a thickness direction in an environment of 23° C. by a nanoindentation method.

10. The exterior material for electrical storage devices according to claim 2, wherein the hardness of the resin of the surface coating layer is 233.3 MPa or more as measured on a cross-section of the surface coating layer in a thickness direction in an environment of 23° C. by a nanoindentation method.

11. The exterior material for electrical storage devices according to claim 2, wherein the hardness of the filler of the surface coating layer is 300.0 MPa or more as measured on a cross-section of the surface coating layer in a thickness direction in an environment of 23° C. by a nanoindentation method.

12. The exterior material for electrical storage devices according to claim 2, wherein the hardness of the resin of the surface coating layer is 50.0 MPa or more as measured on a cross-section of the surface coating layer in a thickness direction in an environment of 23° C. by a nanoindentation method.

13. The exterior material for electrical storage devices according to claim 1, wherein inorganic filler of the surface coating layer is silica.

14. The exterior material for electrical storage devices according to claim 1, wherein the polyisocyanate curing agent of the surface coating layer is an aromatic isocyanate.

15. The exterior material for electrical storage devices according to claim 1, wherein the surface coating layer contains no wax.

16. The exterior material for electrical storage devices according to claim 1, wherein the inorganic filler of the surface coating layer is kaolin.

17. The exterior material for electrical storage devices according to claim 1, wherein the barrier layer is a metal foil or a deposited film.

18. The exterior material for electrical storage devices according to claim 1, wherein the sealant contains two or more types of slipping agents.

19. The exterior material for electrical storage devices according to claim 1, wherein the laminate further comprises an adhesive layer, and wherein the adhesive layer is a cured product of a resin composition containing an acid-modified polyolefin and at least one selected from the group consisting of a compound having an isocyanate group, a compound having an oxazoline group, and a compound having an epoxy group.

20. The exterior material for electrical storage devices according to claim 1, wherein the laminate further comprises an adhesive layer, and wherein the adhesive layer is a cured product of a resin composition containing a curing agent having at least one selected from the group consisting of an oxygen atom, a heterocyclic ring, a C=N bond, and a C—O—C bond.

* * * * *